US010140261B2

(12) United States Patent
Yang et al.

(10) Patent No.: US 10,140,261 B2
(45) Date of Patent: Nov. 27, 2018

(54) VISUALIZING FONT SIMILARITIES FOR BROWSING AND NAVIGATION USING A FONT GRAPH

(71) Applicant: ADOBE SYSTEMS INCORPORATED, San Jose, CA (US)

(72) Inventors: Jianchao Yang, San Jose, CA (US); Hailin Jin, San Jose, CA (US); Jonathan Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 844 days.

(21) Appl. No.: 14/286,242

(22) Filed: May 23, 2014

(65) Prior Publication Data

US 2015/0339273 A1    Nov. 26, 2015

(51) Int. Cl.
  *G06F 17/21*    (2006.01)
  *G06F 3/0484*    (2013.01)
  *G06F 17/30*    (2006.01)
  *G06T 11/20*    (2006.01)

(52) U.S. Cl.
  CPC .......... *G06F 17/214* (2013.01); *G06F 3/0484* (2013.01); *G06F 3/04842* (2013.01); *G06F 17/30* (2013.01); *G06F 17/30864* (2013.01); *G06F 17/30958* (2013.01); *G06T 11/206* (2013.01)

(58) Field of Classification Search
  CPC .. G06F 17/214; G06F 3/0484; G06F 3/04842; G06F 17/30; G06F 17/30864; G06F 17/30958; G06T 11/206
  See application file for complete search history.

(56) References Cited

U.S. PATENT DOCUMENTS

| 8,605,089 B1* | 12/2013 | Heckerman | G06T 11/206 345/440 |
| 9,317,777 B2* | 4/2016 | Kaasila | G06F 17/214 |
| 2003/0018652 A1* | 1/2003 | Heckerman | G06F 17/30713 |

* cited by examiner

*Primary Examiner* — Cesar Paula
*Assistant Examiner* — Konrad Kulikowski
(74) *Attorney, Agent, or Firm* — Shook, Hardy & Bacon L.L.P.

(57) ABSTRACT

Font graphs are defined having a finite set of nodes representing fonts and a finite set of undirected edges denoting similarities between fonts. The font graphs enable users to browse and identify similar fonts. Indications corresponding to a degree of similarity between connected nodes may be provided. A selection of a desired font or characteristics associated with one or more attributes of the desired font is received from a user interacting with the font graph. The font graph is dynamically redefined based on the selection.

19 Claims, 7 Drawing Sheets

VISUALIZING FONT SIMILARITIES FOR BROWSING AND NAVIGATION USING A FONT GRAPH

BACKGROUND

As typography is a core design element of any printed or displayed text, graphic designers are frequently interested in typefaces. With the advent of computers and digital typography, the number of different typefaces has continued to grow. Typefaces may include one or more fonts that share common design features. Each font of a typeface includes attributes specific to that font (e.g., weight, slope, width, optimal size, serif, etc.). Given this large number of available fonts, the task of identifying fonts with desired attributes in a collection of typefaces has become an extremely tedious and time-consuming process.

In particular, there are a number of scenarios in which it may be desirable to identify similar fonts among a collection of fonts. For instance, a graphic designer may identify a font that is cost-prohibitive and desires to find a free alternative. In another instance, a graphic designer may desire to identify a particular font but a font recognition system is unable to precisely identify the font. Current systems are limited to providing a list based recommendation of fonts and do not provide a visualization of similarities that may be browsed and navigated allowing the user to select the desired font.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to providing a font graph that can be browsed and navigated by a user to visually identify font similarities. A search request identifying a desired font or defining one or more attributes for the desired font may be received from the user. Characteristics associated with the one or more attributes may be selected by the user and may include weight, slope, width, optimal size, or serif. A font similarity matrix may be obtained that describes the similarity between the desired font and a plurality of fonts. The font similarity matrix may be utilized to provide a font graph having a finite set of notes representing similar fonts and a finite set of undirected edges denoting font similarities corresponding to the desired font. Edge weights corresponding to a degree of similarity between similar fonts (e.g., a particular font and the desired font) may alter the size or appearance of the edges or nodes. The font graph may be dynamically redefined based on user manipulation or interaction with the font graph.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, a number of systems have been developed for font recognition or identifying similar fonts. However, these systems typically fall short in their usefulness because such systems do not always identify the correct font. Even when they do, these systems are limited to providing list based results and do not provide a visualization of font similarities that can be browsed or navigated.

Embodiments of the present invention are generally directed to providing a font graph that can be browsed or navigated by a user until the desired font is identified. A symmetric font similarity matrix M is obtained where the (i, j)-th entry of the matrix $M_{ij} \in [0, 1)$ measures the similarity between font $f_i$ and font $f_j$ (i.e., $S(f_i, f_j) = M_{ij}$). There may be many different ways to define a similarity matrix such as those described in U.S. patent application Ser. No. 13/953,394 (U.S. patent application '394), which is incorporated herein by reference. For example, a normalized confusion matrix based on a font recognition algorithm may be utilized where the (i, j)-th entry of the confusion matrix measures the probability that $f_i$ is confused to be font $f_j$ or vice versa. Confusion between fonts may indicate a similarity between two fonts. Similarly, features may be extracted directly from a font image to define the similarity between fonts. In this instance, $M_{ij} = \exp(-d(f_i, f_j)/\sigma^2)$, where $d(f_i, f_j)$ is the distance between the class mean features of font $f_i$ and $f_j$. As can be appreciated, any number of algorithms may be utilized to determine similarities between fonts and define a similarity matrix.

Once a font matrix M is obtained, a font graph can be defined as G={V, E}, where V is a finite set of nodes representing fonts and E is a finite set of undirected edges denoting the font similarities. The edge set E is defined based on the similarity matrix M as $E_{ij} = M_{ij}$. If $E_{ij} = 0$, there is no connection between node i (font $f_i$) and node j (font $f_j$).

If $E_{ij}$, j=0, there is an edge between node i (font $f_i$) and j (font $f_j$) with edge weight $E_{ij}$. The edge weight represents the similarity strength between node i (font $f_i$) and j (font $f_j$). The font graph can be visualized in a two-dimensional (2D) or three-dimensional (3D) space. A node (i.e., a font) is represented as a point or sample text in the 2D or 3D space and an edge (i.e., a font similarity) is represented as a line connecting two nodes.

The node size may be roughly proportional to its degree. The degree of the node may be defined as the number of edges that connect it to other nodes. For example, the larger the node, the more similarities it shares with other nodes. The width of the edge may be proportional to the edge weight. Similarly, the length of the edge may be inversely proportional to the edge weight. In other words, the length or width of the edge connecting two fonts visually represents the similarity of the two fonts. The edge weight may also be represented by a proximity or appearance (e.g., size) of the two nodes in relation to other nodes in the 2D or 3D space.

Each font of a typeface may have many attributes (e.g., weight, slope, width, and the like). Thus, each font may be described as $f=\{t, a_1, a_2, a_3, \ldots, a_K\}$, where t represents the typeface of this font, $\{a_i\}_{i=1}^K$ represents the possible attributes of the font. Based on the needs or interests of a user, different font graphs may be derived from the similarity matrix M. Similarity between two typefaces m and n are defined as:

$$M_{mn}^t = \sum_{(i|f_i(t)=m)} \sum_{(j|f_j(t)=n)} M_{ij}$$

Suppose a user is interested in a particular font attribute $a_k=x$. The new font graph is defined on the font set $\{f_i|f_i(a_k)=x, f_i(a_j)=0, j\neq k\}$, which may be a subset of V. The font similarity is then directly taken from M. Now suppose the user is interested in two font attributes $a_{k_1}=x_1$ and $a_{k_2}=x_2$. The new font graph is defined on the font set $\{f_i|f_i(a_{k_1})=x_1, f_i(a_{k_2})=x_2, f_i(a_j)=0, j\neq x_1, j\neq x_2\}$. The font similarity is taken directly from M. Similarly, font graphs for more than two font attributes can be defined. As can be appreciated, the user may also be interested in particular font attributes but is not interested in fonts that have certain other attributes. In this regard, the font graph may be defined on a font set that includes the particular font attributes but excludes fonts that have the certain other attributes.

Once the font graph is provided, the user is able to browse and navigate on the font graph. For example, the user may be interested in a particular font. The user may search the font on the graph, locate the font, and then browse similar fonts. In another example, the user may wish to identify the font of text in an input image. The user may utilize a visual font recognition system to obtain a suggested list of matching fonts. These suggested fonts are mapped on to the font graph and the user may then browse fonts associated with the suggested nodes.

To assist the user while browsing or navigating the font graph, the user is able to drag the font graph around, zoom in on a particular node, or zoom out. In a 3D font graph, the user is able to rotate the font graph. A text search may be initiated by the user to locate a particular font in the font graph. The font graph may be dynamically redefined based on the font retrieved by the text search. Similarly, if the user selects or interacts with a font from the font graph, the font will be placed in the center and all fonts that are connected are highlighted. Each font may be represented by sample text which may be specified by the user, allowing the user to view samples of each font provided by the font graph. The size of the surrounding sample text indicates the similarity to the selected font. As the user interacts with the font graph, such as by specifying additional attributes, the font graph dynamically changes in accordance with the corresponding changes in similarity as defined by the similarity matrix M from which the font graph is derived.

Accordingly, in one aspect, an embodiment of the present invention is directed to a non-transitory computer storage medium comprising computer-useable instructions that, when used by one or more computing devices, cause the one or more computing devices to perform operations. The operations include receiving a search request from a user. The search request identifies a desired font or defines one or more attributes for the desired font. The operations also include obtaining a font similarity matrix describing the similarity between the desired font and a plurality of fonts. The operations further include, based on the font similarity matrix, providing a font graph with a finite set of nodes representing similar fonts and a finite set of undirected edges denoting font similarities corresponding to the desired font.

In another embodiment of the invention, an aspect is directed to a computer-implemented method. The method includes providing, by a computing device, a font graph with a finite set of nodes representing fonts. The method also includes receiving a selection of a desired font or characteristics associated with one or more attributes of the desired font from a user. The method further includes dynamically redefining the font graph based on the selection, providing the desired font as a center node of the font graph and including a finite set of undirected edges denoting font similarities between connected nodes.

A further embodiment is directed to a computerized system comprising: one or more processors; and one or more computer storage media storing computer-useable instructions that, when used by the one or more processors, cause the one or more processors to: receive an indication of a desired font or characteristics of one or more attributes associated with the desired font; providing a font graph based on a font similarity matrix, the font graph including a finite set of nodes representing fonts and a finite set of undirected edges denoting font similarities between connected nodes; and indicating a degree of similarity between the connected nodes, the degree of similarity corresponding to a size or appearances of undirected edges between two nodes or sample text associated with a similar node.

Figure 1:
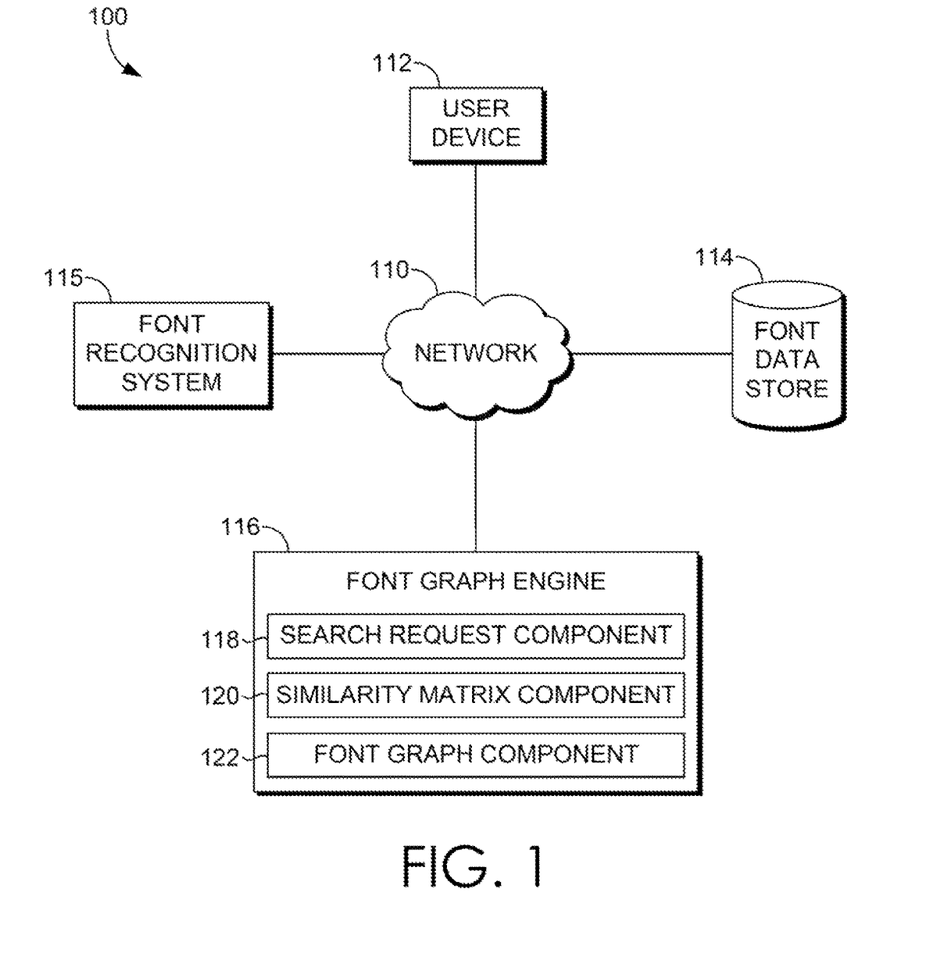
FIG. 1 is a block diagram showing a font analysis system for determining a visual similarity between fonts in accordance with an embodiment of the present invention.

Referring now to FIG. 1, a block diagram is provided that illustrates a font graph system 100 for providing a font graph that can be browsed and navigated by a user to visually identify font similarities in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The font graph system 100 may be implemented via any type of computing device, such as computing device 800 described below with reference to FIG. 8, for example. In various embodiments, the font graph system 100 may be implemented via a single device or multiple devices cooperating in a distributed environment.

The font graph system 100 generally operates to provide a visualization of the similarity of fonts and enable browsing and navigation within a font graph. Among other components not shown, the system 100 may include a user device 112, a font similarity matrix system 113, a font data store 114, a font recognition system, 115, and a font graph engine 116. It should be understood that the system 100 shown in FIG. 1 is an example of one suitable computing system architecture. Each of the components shown in FIG. 1 may be implemented via any type of computing device, such as computing device 800 described with reference to FIG. 8, for example. The components may communicate with each other via a network 110, which may include, without limitation, one or more local area networks (LANs) and/or wide area networks (WANs). Such networking environments are commonplace in offices, enterprise-wide computer networks, intranets, and the Internet. It should be understood that any number of user devices, font similarity matrix systems, font data stores, font recognition systems, and font graph engines may be employed within the system 100 within the scope of the present invention. Each may comprise a single device or multiple devices cooperating in a distributed environment. For instance, the font graph engine 116 may be provided via multiple devices arranged in a distributed environment that collectively provide the functionality described herein. In another instance, the font graph engine 116 and one or more of the other components that comprise the font graph system 100 may be provided via a single device. For example, the font graph engine 116 and the font similarity matrix system 113 may be provided via a single device. Additionally, other components not shown may also be included within the network environment.

As shown in FIG. 1, the font graph system 100 includes a font graph engine 116 that generates font graphs utilizing fonts stored in font data store 114. While only a single font data store 114 is shown in FIG. 1, it should be understood that the font graph system 100 may employ any number of font data stores. The font data store 114 may define one or more attributes associated with each font. By way of example only and not limitation, the attributes may include weight, slope, width, optimal size, serif, and the like. Each of these attributes are utilized by a font similarity matrix system 113 that may determine how similar one or more fonts are to a desired font or how likely one or more fonts are to be confused with the desired font. The font similarity matrix system 113 utilizes these determinations to define a similarity matrix that is utilized by the font graph engine 116 to provide a font graph to a user.

As shown in FIG. 1, the font graph engine 116 includes, among other things not shown, a search request component 118, a similarity matrix component 120, and a font graph component 122. The search request component 118 receives a search request identifying a desired font or defining one or more attributes for the desired font. The search request may be initiated by a user and received from user device 112. The search request may be a text based request that identifies the desired font or identifies desired attributes. Similarly, the search request may be initiated by a user and received from font recognition system 115. For example, the user may wish to identify a font or similar fonts using font recognition system 115. Font recognition system 115 may communicate the request to search request component 118. The request may identify the font, approximately identify the font, or define one or more attributes associated with the font. Additionally, the search request may be initiated by a user from a font graph. In this regard, each time the user interacts with (e.g., by moving, selecting a font, selecting desired attributes for a font, zooming in, or zooming out) the font graph, a search request may be received by search request component 118 that identifies a new desired font or definitions of one or more attributes for the desired font.

Similarity matrix component 120 receives the desired font or attributes associated with the desired font from search request component 118. As described herein, the desired font or attributes associated with the desired font may be based on a search request received from user device 112, font recognition system 115, or based on an interaction with a front graph that has already been provided to the user. Accordingly, the desired font or attributes associated with the desired font are communicated to the font similarity matrix system 113 to define the appropriate similarity matrix. The font similarity matrix system 113 may utilize any similarity algorithm, such as those described herein, to define the similarity matrix incorporating fonts stored in the font data store 114. The similarity matrix describes the similarity between the desired font and a plurality of fonts stored in the font data store 114.

Font graph component 122 obtains the similarity matrix from the font similarity matrix system 113 to generate a font graph providing the desired font as the center node. The font graph comprises a finite set of nodes representing similar fonts. A finite set of undirected edges denotes font similarities corresponding to the desired font, which is provided as the center node. Further, each similar node is highlighted and may be represented by sample text. The sample text may be specified by the user. The size of each node or corresponding sample text may denote the edge weight or degree of similarity between each node and the desired node. In embodiments, the user may specify attributes of the desired font (e.g., a desired attribute; specific values of a particular attribute, such as a particular slope; the absence of a particular attribute or the absence of a specific value for a particular attribute; and the like), which dynamically redefines the font graph. A new search request is communicated to search request component 118 which causes the similarity matrix component to define a new similarity matrix. The font graph component 122 generates a new font graph based on the new similarity matrix.

The user may browse the font graph to display fonts similar to the desired font or navigate to another font. Upon receiving selection of a particular font from the font graph, the font graph may be dynamically redefined based on the selection. In this regard, the particular font may be communicated to the search request component 118 that may be utilized by similarity matrix component 120 to define a new similarity matrix. The new similarity matrix is obtained by font graph component 122 to generate a new font graph. The new font graph provides the particular font as the center node and all similar fonts that are connected to the center node are highlighted.

Similarly, the font graph may allow text-based searching to locate a particular font in the font graph. After receiving a text search for the particular font, the particular font is communicated to the search request component 118. The particular font is utilized by similarity matrix component 120 to define a new similarity matrix that is obtained by font graph component 122 to generate a new font graph for the particular font.

The user may also drag the font graph which may move a different node to the center. Accordingly, a different font associated with the different node may be communicated to the search request component 118 which in turn communicates the different font to the similarity matrix component 120. The different font is utilized by similarity matrix component 120 to define a different similarity matrix. The different similarity matrix is obtained by font graph component 122 to generate a different font graph.

If a suggested list of fonts is received from font recognition system 115, the suggested fonts may be mapped onto the font graph without any one font represented as a center node. Rather, each of the suggested fonts may be represented as suggested nodes with edges representing similarities between each of the suggested nodes. The user may browse each of the suggested nodes and the font graph provides the user a visualization of each suggested font.

Figure 2:
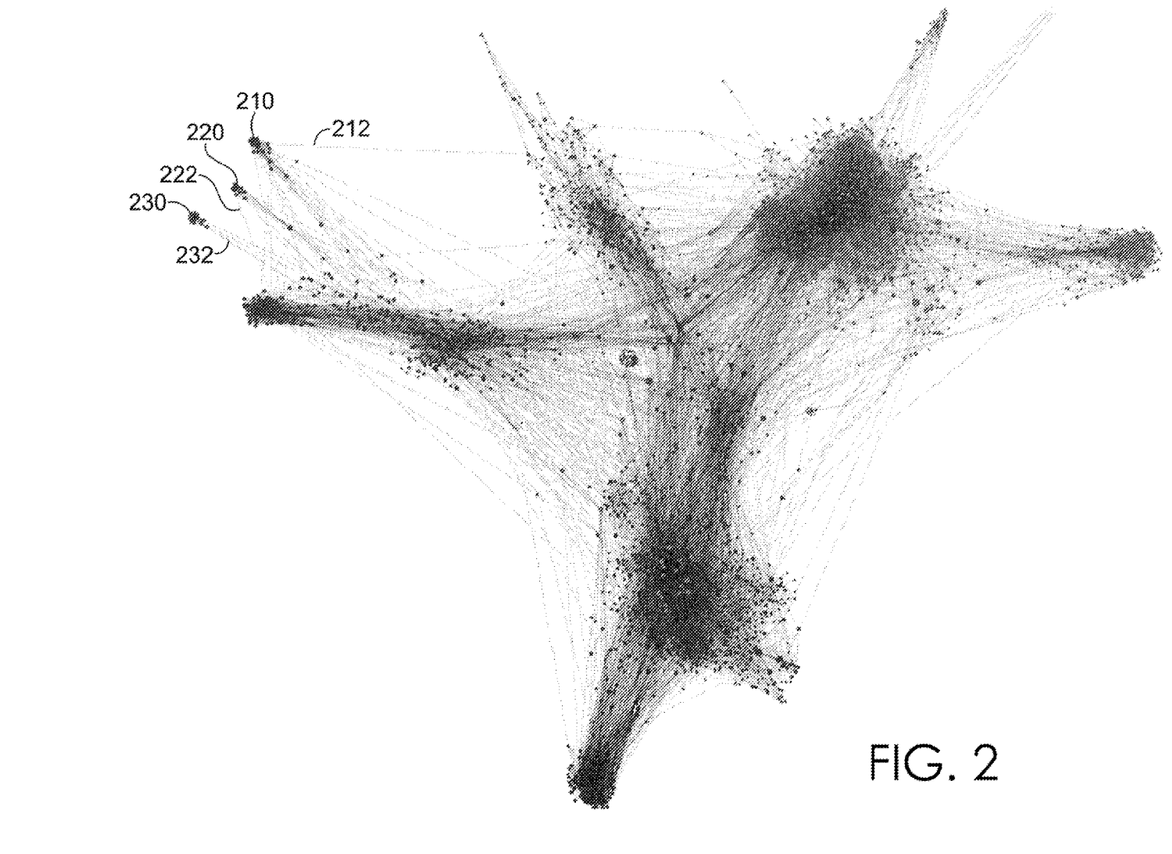
FIG. 2 is an exemplary diagram of a coarse font graph in accordance with an embodiment of the present invention.

An exemplary diagram of a coarse font graph that may be provided is shown in FIG. 2. As can be seen in FIG. 2, a finite number of nodes 210, 220, 230 representing fonts are provided to the user. A finite number of edges, 212, 222, 232 representing similarities between the fonts are also provided. As described herein, the appearance of the nodes may be influenced by how common a particular font may be or how many connections to other nodes may exist for that font. For example, a larger node may indicate a more common font and a smaller node may indicate a less common font. Similarly, the appearance of the edges may be influenced by an edge weight that represents the similarity strength between connected nodes. For example, an edge that appears thicker may indicate the similarity between two nodes is stronger than an edge that appears thinner. In another example, an edge that appears shorter may indicate the similarity between two nodes is stronger than an edge that appears longer. In other words, a node that is closer to a particular node than another node may indicate the node is more similar to the particular node than the other node. As the user interacts with the font graph, such as by dragging the font graph, rotating the font graph, zooming in on a particular node, or zooming out from a particular node, the font graph is dynamically redefined.

Figure 3:
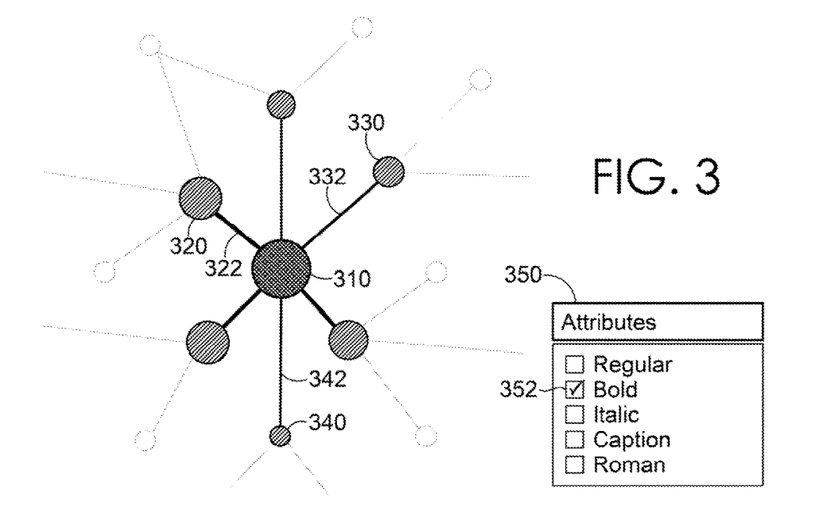
FIG. 3 is an exemplary diagram of a font graph shown with zoom in accordance with an embodiment of the present invention.

In FIG. 3, an exemplary diagram of a font graph shown with zoom is provided. As can be seen in FIG. 3, a finite number of nodes 320, 330, 340 representing fonts with similarities to the desired font corresponding to node 310 are provided to the user. The desired font corresponding to node 310 is provided in the center of the font graph. A finite number of edges, 322, 332, 342 representing similarities between the nodes 320, 330, 340 and the desired font corresponding to node 310 are also provided. As illustrated, the appearance of the nodes 320, 330, 340 may be influenced by the strength of similarity between each node 320, 330, 340 and the desired font corresponding to node 310. Similarly, the appearance of the edges 322, 332, 342 may also be influenced by the strength of similarity between each node 320, 330, 340 and the desired font corresponding to node 310. In this example, edge 322 appears to be the thicker than edges 332, 342 and node 320 appears to be closer than nodes 330, 340 indicating the font corresponding to node 320 is more similar to the desired font corresponding to node 310 than the fonts corresponding to nodes 330, 340. Similarly, node 320 appears larger than nodes 330, 340 which may also indicate the font corresponding to node 320 is more similar to the desired font corresponding to node 310 than the fonts corresponding to nodes 330, 340. Attributes may be defined as described herein by interacting with attribute control 350. For example, the user may select that only nodes corresponding to BOLD 352 fonts should be displayed. As the user defines attributes using attribute control 350, the font graph is dynamically redefined.

Figure 4:
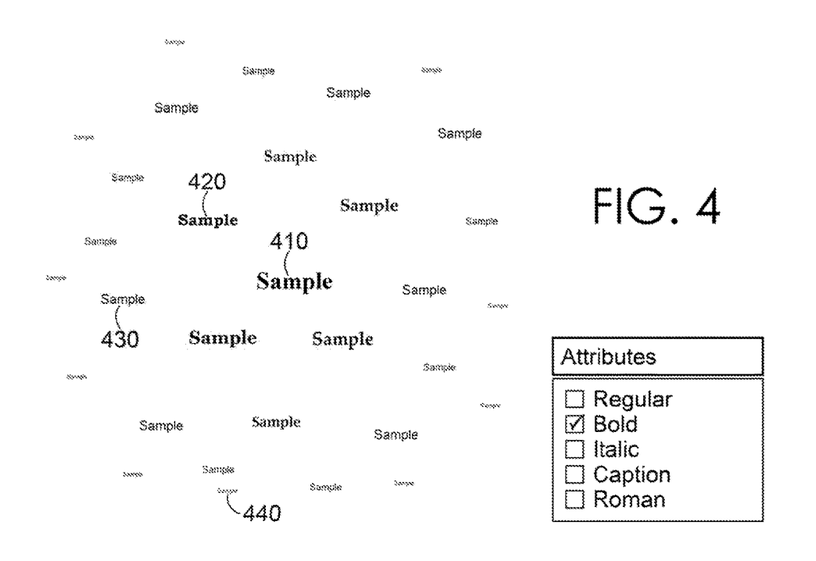
FIG. 4 is an exemplary diagram of a font graph shown with sample text in accordance with an embodiment of the present invention.

FIG. 4 illustrates an exemplary diagram of a font graph shown with sample text. As illustrated, each node 410, 420, 430, 440 is depicted as sample text corresponding to the font associated with that node 410, 420, 430, 440. This provides a visual of how each similar font corresponding to nodes 420, 430, 440 appears compared to the desired font corresponding to node 410. The appearance of the nodes 420, 430, 440 may be influenced by the strength of similarity between each node 420, 430, 440 and the desired font corresponding to node 410. In this example, node 420 appears to be closer than nodes 430, 440 indicating the font corresponding to node 420 is more similar to the desired font corresponding to node 410 than the fonts corresponding to nodes 430, 440. Similarly, node 420 appears larger than nodes 430, 440 which may also indicate the font corresponding to node 420 is more similar to the desired font corresponding to node 410 than the fonts corresponding to nodes 430, 440. If any attributes are selected, each font corresponding to a node in the font graph that includes such attributes may be provided as sample text with those attributes. In this example, because BOLD has been selected, each font corresponding to a node that includes the BOLD attribute is provided in bold (e.g., 410, 420; but not 430, 440). This allows the user to easily select fonts that include attributes the user desires.

Figure 5:
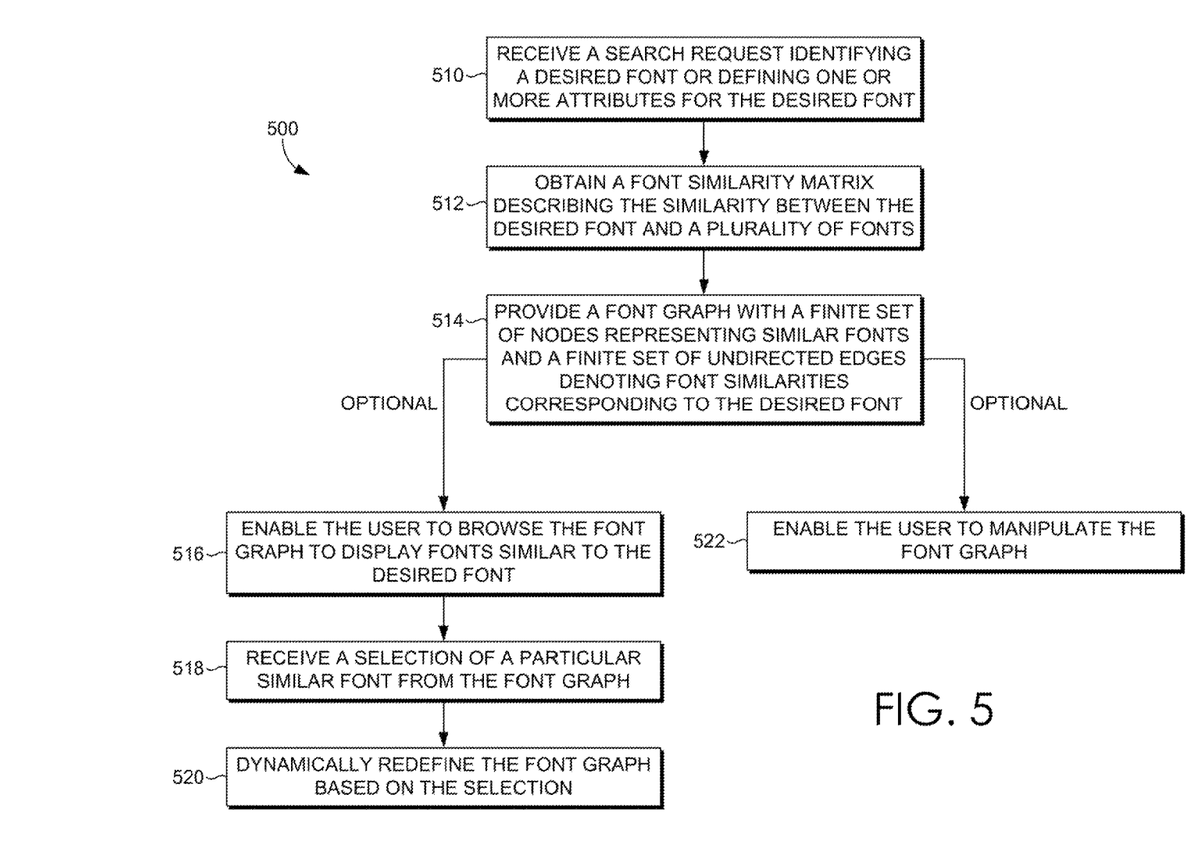
FIG. 5 is a flow diagram showing a method for providing a font graph based on a search request in accordance with an embodiment of the present invention.

Referring now to FIG. 5, a flow diagram is provided that illustrates a method 500 for providing a font graph based on a search request in accordance with an embodiment of the present invention. The method 500 may be performed, for instance, by the font graph system 100 of FIG. 1. As shown at block 510, a search request identifying a desired font or defining one or more attributes for the desired font is received. The search request may be received from a user as a text based request for a particular font. The search request may also be received from a visual font recognition system, such as the font recognition system 115 of FIG. 1. The search request may also be received based on an interaction with the font graph, such as by selecting or interacting with a node corresponding to a font. In one embodiment, characteristics associated with one or more attributes are selected by the user. The one or more attributes include weight, slope, width, optimal size, or serif.

A font similarity matrix is obtained at block 512. The font similarity matrix may be provided by any algorithm or method for determining similarities or confusion between fonts. Accordingly, the font similarity matrix describes the similarity between the desired font and a plurality of fonts. Based on the font similarity matrix, a font graph is provided at block 514. The font graph may be represented in 2D or 3D space.

The font graph comprises a finite set of nodes representing similar fonts and a finite set of undirected edges denoting font similarities corresponding to the desired font. In one embodiment, the finite set of nodes is represented by sample text. The finite set of undirected edges may be represented by a size or appearance associated with the sample text. In other words, rather than edges connecting the nodes, the edges may instead be represented by the size or appearance of the nodes or sample text. In embodiments, an edge weight corresponds to a degree of similarity between similar fonts (e.g., a particular font and the desired font). An edge length of the finite set of undirected edges may be inversely proportional to the edge weight. Similarly, an edge width of the finite set of undirected edges may be proportional to the edge weight.

In embodiments, the user is able to browse and navigate the font graph, at block 516, to display fonts similar to the desired font. For example, a selection of a particular similar font may be received, at block 518, based on an interaction with the font graph. Accordingly, the font graph may be dynamically redefined, at block 520, based on the selection. Similarly, as shown at step 517, the user may be able to manipulate the font graph. For example, the user may drag the font graph to move a particular similar font to the center. Or the user may zoom in on a particular similar font or zoom out to view additional fonts. In each instance, the font graph may be dynamically redefined, at block 520, based on the corresponding manipulation.

Figure 6:
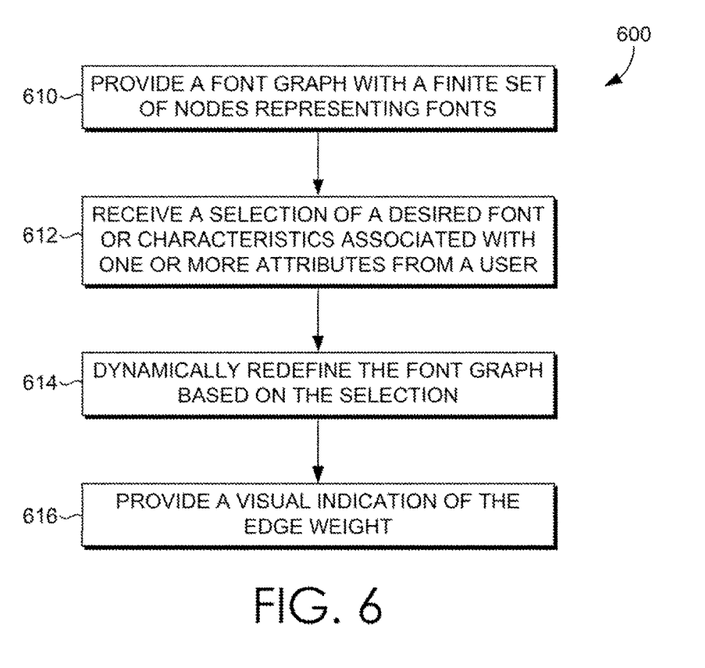
FIG. 6 is a flow diagram showing a method for dynamically redefining a font graph based on a user selection in accordance with an embodiment of the present invention.

Turning to FIG. 6, a flow diagram is provided that illustrates a method 600 for dynamically redefining a font graph based on a user selection in accordance with an embodiment of the present invention. The method 600 may be performed, for instance, by the font graph system 100 of FIG. 1. As shown at block 610, a font graph is provided. The font graph comprises a finite set of nodes representing fonts. The nodes may appear as sample text corresponding to the associated font represented by each node.

A selection of a desired font or characteristics associated with one or more attributes of the desired font is received from a user at block 612. The font graph is dynamically redefined, at block 614, based on the selection. For example, the desired font selected by the user or a font having the selected characteristics associated with one or more attributes may be provided as a center node of the font graph. Accordingly, a finite set of undirected edges denoting font similarities between connected nodes is provided. In embodiments, the undirected edges are associated with an edge weight corresponding to the degree of similarity between the connected nodes. Further, a visual indication of the edge weight is provided at block 616. For example, the visual indication may include a size or appearance of the undirected edge. In another example, the visual indication may include a size or appearance of sample text associated with a particular node.

Figure 7:
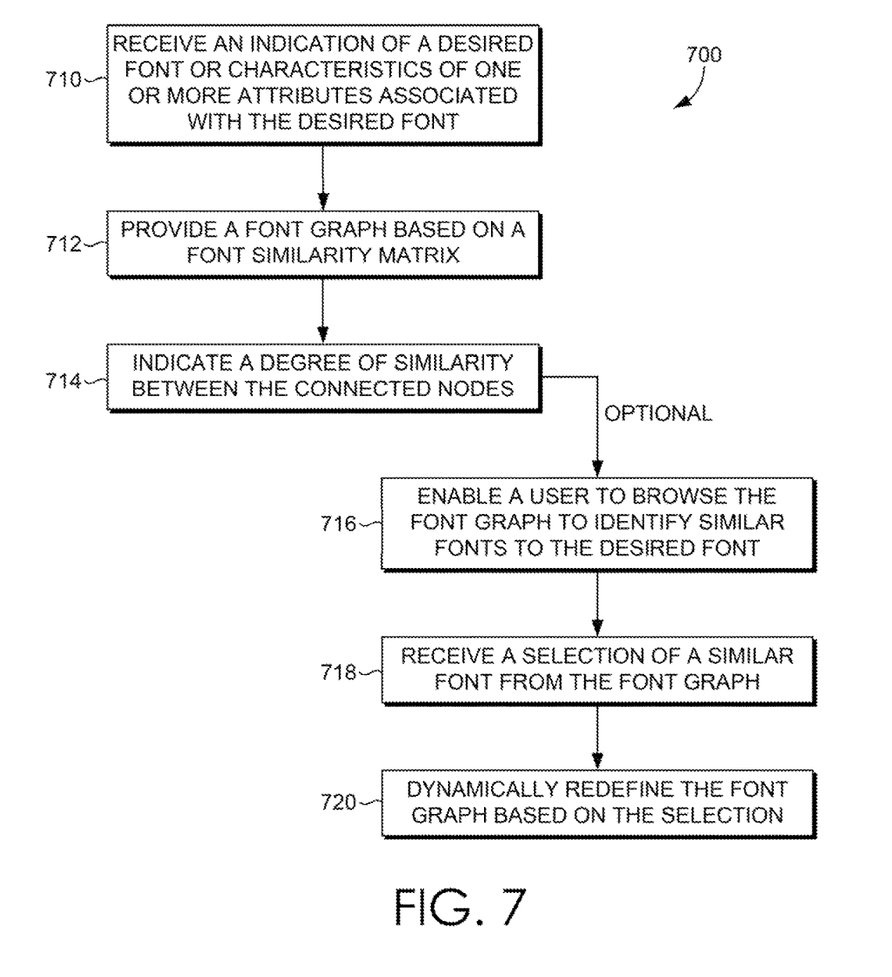
FIG. 7 is a flow diagram showing a method for providing a font graph based on an indication of a desired font in accordance with an embodiment of the present invention.

In FIG. 7, a flow diagram is provided that illustrates a method 700 for providing a font graph based on an indication of a desired font in accordance with an embodiment of the present invention. The method 700 may be performed, for instance, by the font graph system 100 of FIG. 1. As shown at block 710, an indication of a desired font or characteristics of one or more attributes associated with the desired font is received. A font graph based on a font similarity matrix is provided at block 712. The font graph includes a finite set of nodes representing fonts and a finite set of undirected edges denoting font similarities between connected nodes. At block 714, a degree of similarity between the connected nodes is indicated. The degree of similarity may correspond to a size or appearances of undirected edges between two nodes or sample text associated with a similar node.

In embodiments, the user may be able to browse, as shown at block 716, the font graph to identify similar fonts to the desired font. A selection of a similar font may be received, at block 718, from the font graph. The font graph may be dynamically redefined based on the selection at block 720. Accordingly, the similar font is provided as a center node of the font graph and the finite set of undirected edges are redefined to denote font similarities between the similar font and connected nodes.

Figure 8:
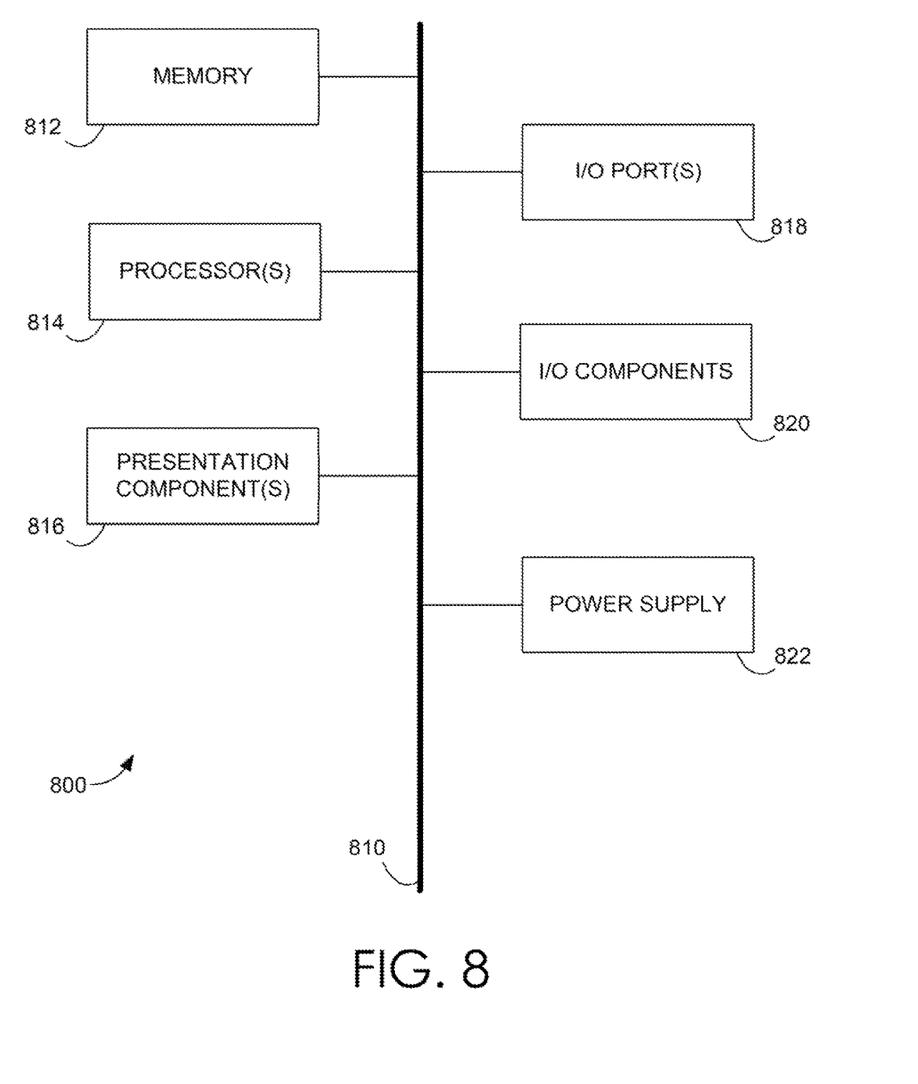
FIG. 8 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for an objective approach for determining the visual similarity between fonts. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to perform operations comprising:
receiving a search request defining a desired attribute value for a desired font, the desired attribute value being specifically selected via a graphical user interface from among a set of candidate attribute values associated with an attribute;
obtaining a font similarity matrix for determining the similarity between a plurality of fonts;
deriving a font graph using the font similarity matrix, the font graph defined on a font set based on the desired attribute value; and
providing the font graph defined on the font set, the font graph having a finite set of nodes representing similar fonts and a finite set of undirected edges denoting font similarities corresponding to the font set.

2. The non-transitory computer storage medium of claim 1, wherein the attribute is at least one of weight, slope, width, optimal size, and serif.

3. The non-transitory computer storage medium of claim 1, wherein the font graph is represented in two-dimensional or three-dimensional space.

4. The non-transitory computer storage medium of claim 1, wherein the finite set of nodes is represented by sample text.

5. The non-transitory computer storage medium of claim 4, wherein the finite set of undirected edges is represented by a size or appearance associated with the sample text.

6. The non-transitory computer storage medium of claim 1, wherein an edge weight corresponds to a degree of similarity between similar fonts.

7. The non-transitory computer storage medium of claim 5, wherein an edge length of the finite set of undirected edges is inversely proportional to the edge weight.

8. The non-transitory computer storage medium of claim 5, wherein an edge width of the finite set of undirected edges is proportional to the edge weight.

9. The non-transitory computer storage medium of claim 1, further comprising enabling the user to browse the font graph to display fonts similar to the desired font.

10. The non-transitory computer storage medium of claim 8, further comprising receiving a selection of a particular similar font from the font graph.

11. The non-transitory computer storage medium of claim 9, further comprising dynamically redefining the font graph based on the selection.

12. The non-transitory computer storage medium of claim 1, further comprising enabling the user to manipulate the font graph by dragging the font graph to move a particular similar font to the center, zoom in on a particular similar font, or zoom out to view additional similar fonts.

13. The non-transitory computer storage medium of claim 1, wherein the search request is received via a visual font recognition system.

14. The non-transitory computer storage medium of claim 1, wherein the search request is received based on an interaction with the font graph.

15. A computer-implemented method comprising:
providing a font graph with a finite set of nodes representing a first font set, wherein the font graph is derived from a similarity matrix as defined by the first font set;
receiving a selection of a desired attribute value, the desired attribute value being specifically selected via a graphical user interface from among a set of candidate attribute values associated with an attribute for a desired font from a user, wherein the user specifies the one or more attributes; and dynamically redefining the font graph based on the desired attribute value, wherein the redefined font graph is derived from the similarity matrix as defined by a second font set based on the desired attribute value, a font being provided as a center node of the redefined font graph, the font having the desired attribute value, and including a finite set of undirected edges denoting font similarities between connected nodes representing fonts in the second font set.

16. The method of claim 15, wherein the undirected edges are associated with an edge weight corresponding to the degree of similarity between the connected nodes.

17. The method of claim 16, further comprising providing a visual indication of the edge weight, the visual indication including a size or appearance of the undirected edge or a size or appearance of sample text associated with a particular node.

18. A computerized system comprising:
one or more processors; and
one or more computer storage media storing computer-useable instructions that, when used by the one or more processors, cause the one or more processors to:
receive an indication defining one or more desired attribute values for a desired font, wherein the one or more desired attribute values are specifically selected via a graphical user interface from among a set of candidate attribute values associated with one or more attributes;
providing a font graph based on a font similarity matrix, the font graph including a finite set of nodes representing fonts and a finite set of undirected edges denoting font similarities between connected nodes, wherein the font graph is defined on a font set including the one or more desired attribute value selected by the user; and
indicating a degree of similarity between the connected nodes, the degree of similarity corresponding to a size or appearances of undirected edges between two nodes or sample text associated with a similar node.

19. The system of claim 18, wherein the computer-useable instructions that, when used by the one or more processors, cause the one or more processors to:
enable a user to browse the font graph to identify similar fonts to the desired font;
receive a selection of a similar font from the font graph; and
dynamically redefine the font graph based on the selection, the similar font being provided as a center node of the font graph and the finite set of undirected edges redefined to denote font similarities between the similar font and connected nodes.

* * * * *

UNITED STATES PATENT AND TRADEMARK OFFICE
CERTIFICATE OF CORRECTION

PATENT NO.        : 10,140,261 B2                                           Page 1 of 1
APPLICATION NO.   : 14/286242
DATED             : November 27, 2018
INVENTOR(S)       : Jianchao Yang, Hailin Jin and Jonathan Brandt It is certified that error appears in the above-identified patent and that said Letters Patent is hereby corrected as shown below:

In the Specification

Column 2, Line 66: Delete "M1j" and insert -- Mjj --.

In the Claims

Column 12, Lines 65-67: Delete "attribute for a desired font from a user, wherein the user specifies the one or more attributes;" and insert -- attribute; --.

Signed and Sealed this
Twenty-seventh Day of August, 2019

Andrei Iancu
*Director of the United States Patent and Trademark Office*